United States Patent [19]

Simuni

[11] Patent Number: 5,313,123
[45] Date of Patent: May 17, 1994

[54] AUTOMOBILE HAVING THE MAGNETOHYDRODYNAMIC ENGINE

[76] Inventor: Leonid Simuni, 1056 Neilson St. Apt. 6A, Far Rockaway, N.Y. 11691

[21] Appl. No.: 981,741

[22] Filed: Nov. 23, 1992

[51] Int. Cl.⁵ ............................................. H02K 44/00
[52] U.S. Cl. ...................................... 310/11; 123/537
[58] Field of Search ................. 310/11; 123/537, 527, 123/538

[56]    References Cited
U.S. PATENT DOCUMENTS

| | | | |
|---|---|---|---|
| 2,997,013 | 8/1961 | Rice | 115/11 |
| 4,300,512 | 11/1981 | Franz | 123/536 |
| 4,454,850 | 6/1984 | Horvath | 123/537 |
| 5,087,215 | 2/1992 | Simuni | 440/6 |
| 5,146,203 | 9/1992 | Simuni | 340/443 |
| 5,235,954 | 8/1993 | Sverdlin | 123/447 |

OTHER PUBLICATIONS

Plasmas and Controlled Fusion by David J. Rose and Melville Clark, Jr. pp. 8 and 9 1961 (Month unknown).

*Primary Examiner*—Steven L. Stephan
*Assistant Examiner*—Judson H. Jones

[57]    ABSTRACT

A magnetohydrodynamic engine comprises an inlet means having a propeller for compressing combustion products, a combustion chamber and a magnetohydrodynamic generator of electro current. A combustion chamber comprises inlet means for introducing a fuel mixture and an oxidizer respectively. A combustion chamber also comprises the magnetohydrodynamic drive of combustion products. A combustion chamber is adapted to produce the high pressure combustion products having an ionic media. A magnetohydrodynamic generator of electro current is adapted to generate an electro current by electro-magnetic induction in result of passing combustion products across the magnetic field. A magnetohydrodynamic engine is adapted for powering an automobile having the electrodrive, to propel marine vessels and to generate an electro-current as stationary power plant.

9 Claims, 2 Drawing Sheets

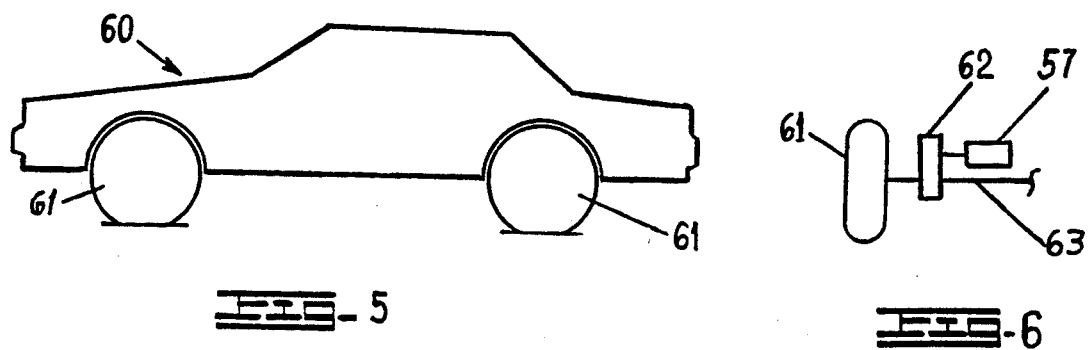
FIG-5
FIG-6
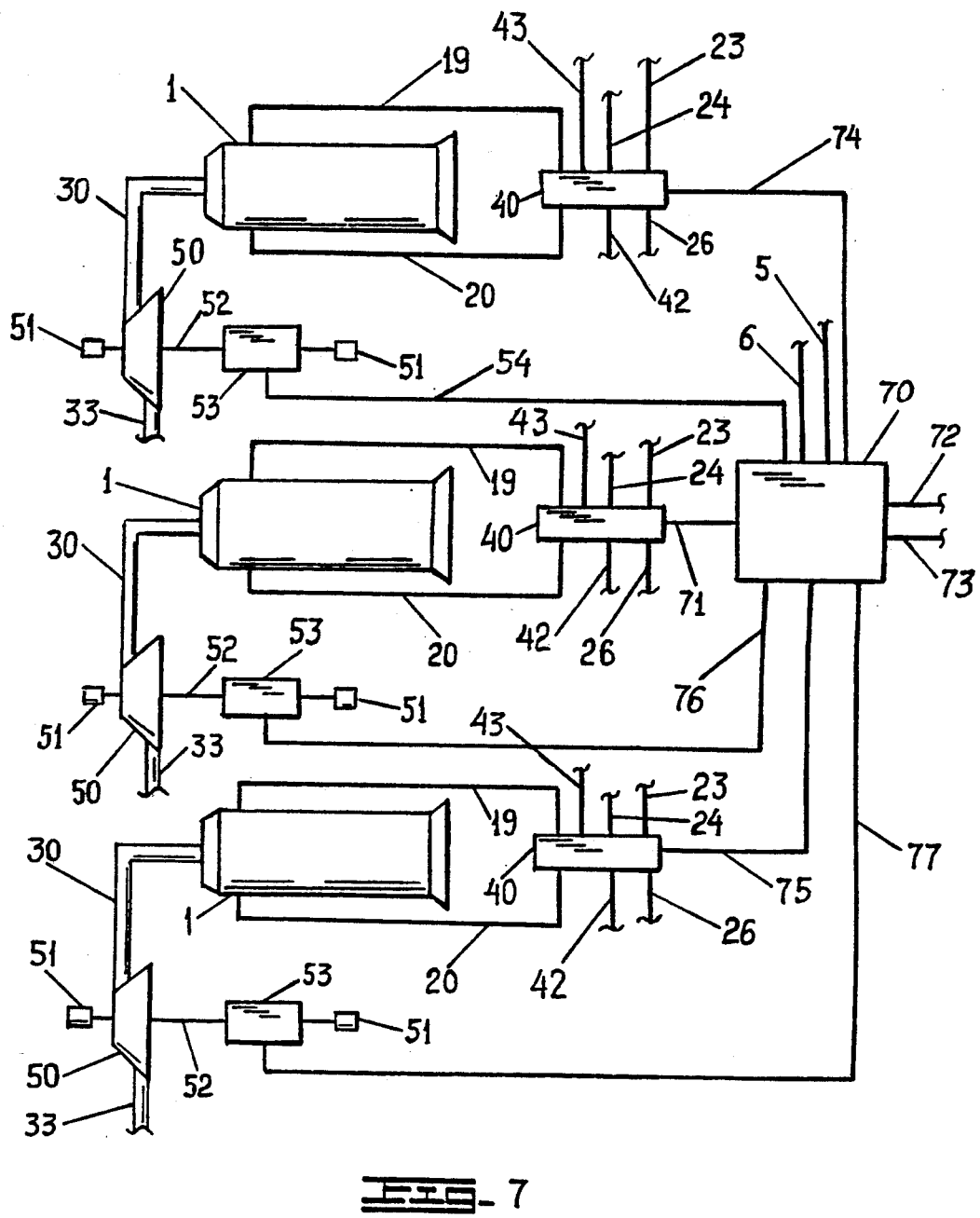
FIG-7

AUTOMOBILE HAVING THE MAGNETOHYDRODYNAMIC ENGINE

BACKGROUND OF THE INVENTION

1. Field of the Invention

The present invention relates to the automobiles having the electro drive (AHED).

2. Prior Art

AHED are produced in great variety of constructions. The maximum speed of AHED is limited. A mileage of AHED is limited by the capacity of the electro accumulator. Existing AHED are not provided with the magnetohydrodynamic engine (MHDE).

SUMMARY OF THE INVENTION

Accordingly, this invention has a main object to improve the magnetohydrodynamic system (MHDS) for generating the electro-current.

Another object is to provide AHED with the MHDS.

A further object of this invention is to provide a stationary power plant having MHDS for generating an electro-current.

The novel features of the present invention are set in particular in the appended claims.

The invention itself, however, both as to its construction and its manner of operation will be best understood from the following description of a preferred embodiment which is accompanied by the following drawings illustrating the invention.

BRIEF DESCRIPTION OF THE DRAWINGS

FIG. 5 is a side view of AHED;

FIG. 6 is a scheme of electro drive;

FIG. 7 is a diagrammic representation of the stationary power plant having a MHDS according to present invention.

DESCRIPTION OF A PREFERRED EMBODIMENT

Figure 1:
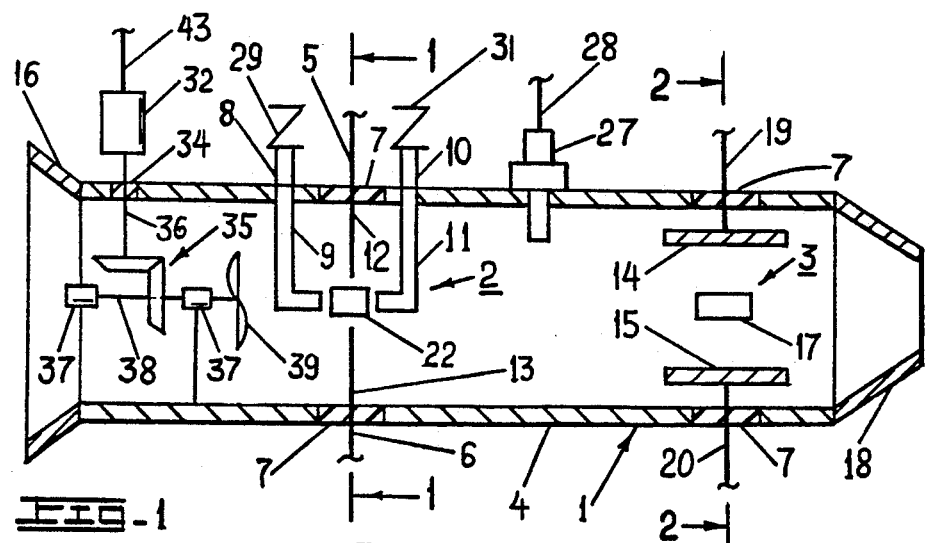
FIG. 1 is a view in axial cross-section of a magnetohydrodynamic engine (MHDE)
Figure 2:
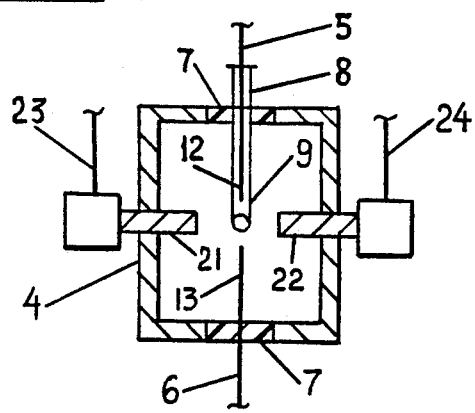
FIG. 2 is a sectional view taken along section lines 1—1 of FIG. 1.
Figure 3:
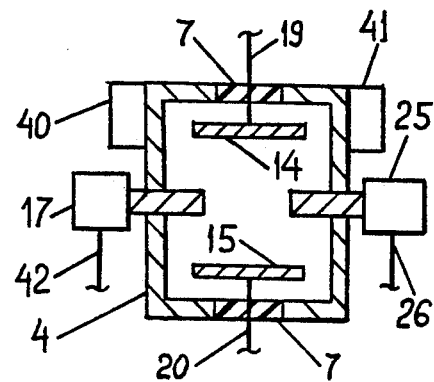
FIG. 3 is a sectional view taken along section lines 2—2 of FIG. 1.
Figure 4:
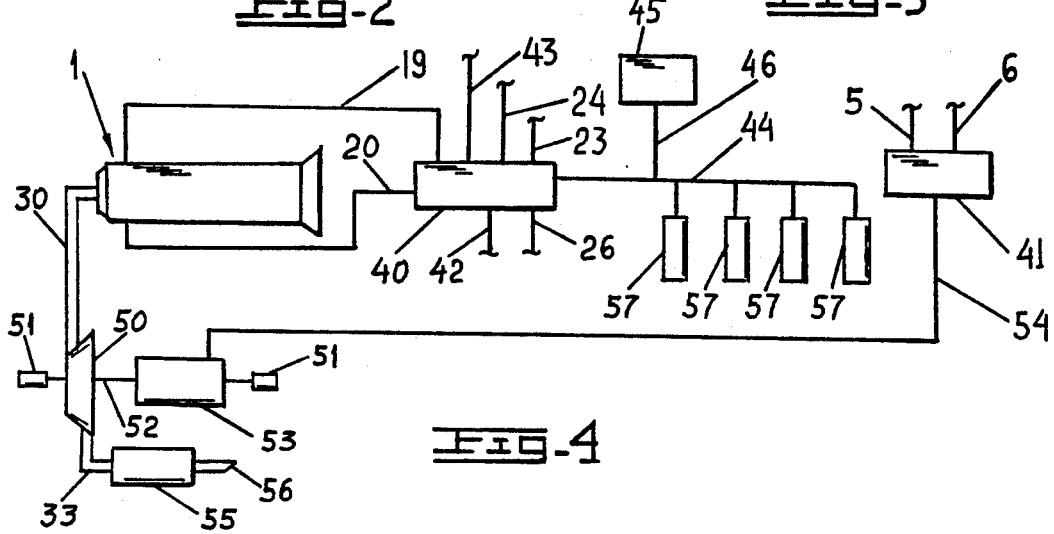
FIG. 4 is a diagrammic representation of MHDS for powering AHED.

A MHDE for generating an electro-current is identified as a whole with reference numeral 1. A MHDE 1 comprises an inlet 16, a propeller 39, a combustion chamber (CC) 2, the magnetohydrodynamic generator (MHDG) of electro-current 3 and a nozzle 18. A tubular propeller 39 is adapted for compressing combustion products. A shaft 38 of the tubular propeller 39 is oriented along the longitudinal axis of MHDE 1. A driving motor 32 is connected to the shaft 38 by means of the driving shaft 36 and the gearing 35. The shafts are supported by means of bearings 37 and 34. A CC 2 comprises electrodes 12 and 13, separately secured to body 4, and electromagnets (EM) or superconducting EM 21 and 22. EM 21 and 22 are adapted for producing the magnetic flux for interaction with the electro-current between the electrodes 12 and 13. Electrodes 12, 13 and EM 21, 22 are arranged so as to produce the magnetohydrodynamic drive (MHDD) in an ionic media. The concept of MHDD is illustrated in U.S. Pat. No. 2,997,013, to W.A. Rice, issued on Aug. 22, 1961. According to the law of Physics an interaction of the magnetic field and the electric current in an ionic media causes a thrust which is directly proportional to the magnetic field strength and the current density. The structure of superconducting magnets is known in the art and is disclosed, for example, in Japan Patent Document No. 62-71794 (A), issued to Masayoshi Wake on Apr. 2, 1987.

The magnetic flux of EM 21, 22 and a current between electrodes 12 and 13 must be oriented by virtue of their mountings so as to produce the propulsive thrust force directed along the longitudinal axis of MHDE 1 in accordance with the "Left Hand Rule".

An ionic media is produced in result of combustion of fuel mixture in CC 2. Inlet means 8 and 10 are associated with a body 4 for introducing the fuel mixture and an oxidizer respectively. Inlet means 8 and 10 are connected to pipes 9 and 11 respectively for conveying a fuel mixture and an oxidizer into CC 2 to position adjacent of electrodes 12 and 13.

It has been known that passage of a electro-current through hydrocarbons produces a fracturing of certain of the hydrogen-carbon bonds, producing lighter phase hydrocarbons, as well as hydrogen.

Electrodes 12 and 13 are connected by cables 5 and 6 to generator of electro-impulses (GOEI) 41 adapted to ignite the fuel mixture, to provide electro-discharge resulting in dissociation of hydrogen molecules in combustion chamber 2 to hydrogen atoms, Electro-discharges are adapted to ionize hydrogen atoms and to cause a fusion of ionized atoms with consequent liberation of heat energy. A combustion chamber 2 is adapted to produce the ionic media by ionization. A combustion chamber 2 is adapted to receive a fuel mixture consisting of gaseous hydrogen and hydrocarbons or to receive a fuel mixture consisting of gaseous hydrogen and the natural gas.

A GOEI 41 having means for accumulation of electro-energy is adapted to provide the voltage pulse applied across the gap between the electrodes 12 and 13 of the order 30,000 volts. The repetition rate of impulses depends on power of MHDE 1. A GOEI 41 provides instantaneous electro-impulses. Valves 29 and 31 are employed for controlling the flows of the fuel mixture and a compressed air or oxygen. Both electro-discharges and combustion of fuel mixture provide the controlled process of limited hydrogen fusion in C.C. 2.

The remote control valves 29 and 31 are connected to the sensor 27 controlling a temperature in the combustion chamber 2. Cable 28 connects sensor 27 to valves 29 and 31. Remote control system is not shown. Electrical discharges cause dissociation of the hydrogen molecules to hydrogen atoms which atoms recombine to generate heat in the C.C. 2 in addition to that generated by the combustion of fuel mixture. The heat generated between electrodes 12 and 13 is sufficient to cause a fusion of ionized atoms with consequent liberation of heat energy. A hydrogen gas prepared by conventional industrial process may be used as a component of fuel mixture for introducing into C.C. 2.

All equipment inside of MHDE 1 including pipes, electrodes must be resistant to heat and high pressure impulses. A CC 2 produces the mixture of high pressure combustion products having the high temperature. These combustion products is a plasma having the ionic media. The flow of plasma is generating the electro-current in the magnetohydrodynamic generator (MHDG) 3 by electro-magnetic induction. A MHDG 3 comprises electrodes 14, 15 and electromagnets or superconducting electromagnets 17, 25. Plasma generates the electro-current in electrodes 14, 15 by passing across the magnetic field produced by electro-magnets 17 and 25. Electrodes 14 and 15 are connected to transmitter 40 of electro current by cables 19 and 20 respectively.

A cable 43 is connecting an electro-motor 32 to the transmitter 40. Cables 23, 24, 26 and 42 are connecting EM or superconducting EM 21, 22, 25 and 17 respectively to the transmitter 40. Cables 5, 6, 19 and 20 are insulated relatively to body 4 by the insulating boxes 7.

FIG. 5 shows an automobile 60 having the electro-drive by electro-motors 57. Motors 57 are driving wheels 61 by gears 62 and shafts 63. Motors 57 are connected both to the transmitter 40 by cable 44 and to electro-accumulator 45 by cable 46. An accumulator 45 also is connected to transmitter 40 for charging (cable not shown). Electrodes 12, 13, 14 and 15 are made of compound consisting of the stainless steel and catalysts, for example, platinum.

Combustion products ejecting through nozzle 18 are conducted by pipe 30 into the gas turbine 50. The gas turbine 50 is driving the electrical generator means having an electrical machine 53 adapted to generate an electric current. A rotor of machine 53 is mechanically connected to the gas turbine 50 by shaft 52. A shaft 52 is supported by bearings 51. An outlet of gas turbine 50 is connected to the cleaning device-muffler 55 by pipe 33. Combustion products are discharged to the atmosphere by pipe 56.

As cleaning device-muffler may be used device illustrated in the U.S. Pat. No. 5,146,203 (device is identified as a whole with reference numeral 19). FIG. 7 shows a power plant for generating an electro-current by utilization of several MHDE 1.

Electrical machines 53 are connected to transformer of electro-current 70 by cables 54, 76 and 77. Transformer 70 provides the voltage pulse of the order 30,000 volts for MHDG 3 and provides an electro-current for consumers by cables 72 and 73. Transformer 70 is connected to MHDG 3 by cables 5 and 6. Transmitters 40 are connected to transformer 70 by cables 71, 74 and 75 so as to convert a direct current into an alternating current.

MHDE according to present invention are adapted;
to drive the electro automobiles;
to propel marine vessels or the like;
to generate an electro-current.

Systems of fuel mixture and oxidizer (oxygen or compressed air) having tanks, pumps, piping are not shown.

The positive results of tests of apparatus fitted to a Ford motor vehicle utilizing the controlled fusion process are illustrated in the U.S. Pat. No. 4,454,850.

The above operations of the MHDE are summarized as follows:
The MHDE is operated for driving an electro-automobile.
The MHDE are operated for generating an electro-current.
The MHDE are operated for propelling ocean-going vessel in accordance with U.S. Pat. No. 5,087,215 by powering electro engines 9 and 10.
The MHDE are operated for propelling ocean-going vessel in accordance with U.S. Pat. No. 5,087,215 by powering the side propulsion systems 36 and 37.

I claim:

1. A magnetohydrodynamic system for powering an electro-automobile, said system comprising in combination:

a magnetohydrodynamic engine;
   an expansion gas turbine for expanding combustion products;
   an electrical generator means comprising an electrical machine adapted to generate an electric current by driving said gas turbine, said electrical machine having a rotor mechanically connected to the expansion gas turbine;
   an inlet means;
   a propeller being mounted on a propeller shaft, said propeller located inside of said engine;
   an electric motor driving said propeller through propeller shaft;
   a combustion chamber associated with a body of said engine;
   the magnetohydrodynamic generator of electro-current associated with said body having a nozzle, said combustion chamber comprising in combination a generator for providing instantaneous electro-impulses, electrodes separately secured to a body of said engine, electromagnets, a control system, inlet means for introducing a fuel mixture and an oxidizer respectively into said combustion chamber, said generator of instantaneous electro-impulses having means to accumulate the electro-energy, said electrodes are connected to said generator of electro-impulses, said generator of electro-impulses is adapted to provide the electrical discharges between said electrodes so as to ignite the fuel/oxidizer mixture, to cause dissociation of hydrogen molecules in said chamber to hydrogen atoms, to ionize hydrogen atoms and to cause a liberation of heat energy in said combustion chamber; said electromagnets and said electrodes forming a magnetohydrodynamic drive, said combustion chamber is adapted to produce the ionic media;
   said magnetohydrodynamic generator comprising electrodes and electromagnets arranged so as to generate the electro current by electro-magnetic induction in result of passing said combustion products having an ionic media across the magnetic field, 2. A system according to claim 1, wherein said nozzle of said magnetohydrodynamic engine is connected to inlet means of said expansion gas turbine by pipes.

3. A system according to claim 1, wherein said automobile comprising a body, wheels having driving electro motors, said motors are connected to said wheels by gears, said driving electro motors are connected to said in claim 1 magnetohydrodynamic engine by cables.

4. A system according to claim 1, wherein said combustion chamber is adapted to receive a fuel mixture consisting of gaseous hydrogen and hydrocarbons.

5. A system according to claim 1, wherein said combustion chamber is adapted to receive a fuel mixture consisting of gaseous hydrogen and the natural gas.

6. A magnetohydrodynamic system for generating an electro-current, said system comprising in combination:
   the magnetohydrodynamic engines; each said engine comprising an expansion gas turbine for expanding combustion products;
   an electrical generator means comprising an electrical machine adapted to generate an electric current by driving said gas turbine, said electrical machine having a rotor mechanically connected to the expansion gas turbine;

an inlet means; a propeller being mounted on a propeller shaft, said propeller located inside of said engine;

an electric motor driving said propeller through propeller shaft;

a combustion chamber associated with a body of said engine;

the magnetohydrodynamic generator of electro-current associated with said body having a nozzle, said combustion chamber comprising in combination a generator for providing instantaneous electro-impulses, electrodes separately secured to a body of said engine, electromagnets, a control system, inlet means for introducing a fuel mixture and an oxidizer respectively into said combustion chamber, said generator of instantaneous electro-impulses having means to accumulate the electro-energy, said electrodes are connected to said generator of electro-impulses, said generator of electro-impulses is adapted to provide the electrical discharges between said electrodes so as to ignite the fuel/oxidizer mixture, to cause dissociation of hydrogen molecules in said chamber to hydrogen atoms, to ionize hydrogen atoms and to cause a liberation of heat energy in said combustion chamber; said electromagnets and electrodes of said combustion chamber are forming a magnetohydrodynamic drive, said combustion chamber is adapted to produce the ionic media; said magnetohydrodynamic generator comprising electrodes and electromagnets arranged so as to generate the electro current by electro-magnetic induction in result of passing said combustion products having an ionic media across the magnetic field, 7. A system according to claim 6, wherein said nozzle of each magnetohydrodynamic engine is connected to inlet means of each said expansion gas turbine by pipes.

8. A system according to claim 6, wherein said combustion chamber is adapted to receive a fuel mixture consisting of gaseous hydrogen and hydrocarbons.

9. A system according to claim 6, wherein said combustion chamber is adapted to receive a fuel mixture consisting of gaseous hydrogen and the natural gas.

* * * * *